United States Patent
Sobel et al.

(10) Patent No.: US 11,885,615 B2
(45) Date of Patent: Jan. 30, 2024

(54) METHOD FOR THICKNESS MEASUREMENTS OF A WORK ITEM IN A ROLLING MILL

(71) Applicant: ABB Schweiz AG, Baden (CH)

(72) Inventors: Jarl Sobel, Bagarmossen (SE); Martin Haldin, Västerås (SE)

(73) Assignee: ABB Schweiz AG, Baden (CH)

( * ) Notice: Subject to any disclaimer, the term of this patent is extended or adjusted under 35 U.S.C. 154(b) by 463 days.

(21) Appl. No.: 17/198,348

(22) Filed: Mar. 11, 2021

(65) Prior Publication Data

US 2021/0325167 A1 Oct. 21, 2021

(30) Foreign Application Priority Data

Apr. 21, 2020 (EP) .................................. 20170575

(51) Int. Cl.
*G01B 7/06* (2006.01)
*B21B 38/04* (2006.01)

(52) U.S. Cl.
CPC .............. *G01B 7/107* (2013.01); *B21B 38/04* (2013.01)

(58) Field of Classification Search
CPC .......... G01B 7/107; G01B 7/10; B21B 38/04; B21B 2038/004; B21B 37/165; B21B 37/24; B21B 37/58; B21B 2261/04
See application file for complete search history.

(56) References Cited

U.S. PATENT DOCUMENTS

| 4,767,496 A | 8/1988 | Hieber |
| 5,660,672 A | 8/1997 | Li et al. |
| 7,005,306 B1 | 2/2006 | Poris |
| 8,154,277 B2 * | 4/2012 | Linder ................... G01B 7/105 324/229 |

(Continued)

FOREIGN PATENT DOCUMENTS

| DE | 69635353 T2 * | 7/2006 | ............. B21B 38/04 |
| EP | 501676 A1 | 9/1992 | |

(Continued)

OTHER PUBLICATIONS

European Search Report; Application No. 20170575.3; Completed: Oct. 5, 2020; dated Oct. 23, 2020. 7 Pages.

*Primary Examiner* — Feba Pothen
(74) *Attorney, Agent, or Firm* — Whitmyer IP Group LLC

(57) ABSTRACT

A method for determining a present thickness of a work item while being processed in a rolling mill, the method including: acquiring a data signal reflecting a time dependence of an eddy current decay in the work item caused by an applied pulsed magnetic field, determining a thickness parameter value based on the acquired signal, the thickness parameter value being determined from samples in the data signal, the thickness parameter value being dependent on a ratio between a thickness of the work item and a resistivity of the work item, computing a ratio between a reference thickness value of the work item and the thickness parameter value to thereby provide an instantaneous resistivity value, determining a mean resistivity value based on the instantaneous resistivity value, and providing an output signal based on the mean resistivity of the work item and the thickness parameter value, the output signal being indicative of the determined present thickness of the work item.

19 Claims, 4 Drawing Sheets

(56) References Cited

U.S. PATENT DOCUMENTS

2001/0054896 A1    12/2001   Mednikov et al.
2007/0090833 A1     4/2007   Hachtel et al.
2016/0370166 A1    12/2016   Yang et al.

FOREIGN PATENT DOCUMENTS

FR        2589566  A1      5/1987
JP     2009160623  A   *   7/2009

* cited by examiner

METHOD FOR THICKNESS MEASUREMENTS OF A WORK ITEM IN A ROLLING MILL

TECHNICAL FIELD

The present invention relates to a method for determining the thickness of a work item while being processed in a rolling mill, to a control unit, and to a rolling mill.

BACKGROUND

Metal rolling generally relates to producing a metal work piece with reduced and uniform thickness by rolling the metal work piece between two rotating work rolls.

In order to ensure high product quality, the thickness of the work piece is accurately monitored and controlled. It is especially important to monitor the rapid thickness variations in the work piece, such as a metal plate, even for very thin metal plates. The operation of the rolling mill can be controlled based on the measured thickness. In particular, the rolling mill at the last stand, i.e., at the end of the process line of the rolling mill, can be controlled based on the thickness measured upstream of the last stand in order to ensure the final product quality.

Conventionally used pulsed eddy current measurement technology is based on measuring eddy currents induced in the metal plate by a rapidly varying magnetic field applied to the metal plate. Based on the measured eddy currents are the resistivity and the thickness of the metal plate extracted.

However, for sufficiently thin plates, conventional methods are not sufficiently accurate and often suffer from noisy measurements which leads to limited applicability below a lower metal plate thickness limit.

Accordingly, it is desirable to improve the accuracy of thickness measurements in rolling mills, especially for relatively thin metal plates.

SUMMARY

In view of the above-mentioned and other drawbacks of the prior art, it is an object of the present invention to provide method for determining a thickness of a work item while being processed in a rolling mill, with improved accuracy.

According to a first aspect of the invention, there is provided a method for determining a present thickness of a work item while being processed in a rolling mill, the method comprising acquiring a data signal reflecting a time dependence of an eddy current decay in the work item caused by an applied pulsed magnetic field.

Further, the method comprising determining a thickness parameter value based on the acquired signal. The thickness parameter value being determined from samples in the data signal. Additionally, the thickness parameter value being dependent on a ratio between a thickness of the work item and a resistivity of the work item.

Further, the method comprising computing a ratio between a reference thickness value of the work item and the thickness parameter value to thereby provide an instantaneous resistivity value.

Additionally, determining a mean resistivity value based on the instantaneous resistivity value, and providing an output signal being based on the mean resistivity of the plate and the thickness parameter value, the output signal being indicative of the present thickness of the work item.

The present invention is at least partly based on the realization to process the thickness parameter value, which reflects the ratio between the thickness of the work item and a resistivity of the work item, for determining a thickness of the work item. Thus, instead of attempting to derive the thickness directly from the thickness parameter value and an uncertain resistivity value that is e.g., temperature dependent, the thickness parameter value is used together with a reference thickness value to obtain an instantaneous resistivity value that may depend on the thickness variations of the work item, e.g., a metal plate, depending on how the reference thickness value is obtained. Based on the instantaneous resistivity value a true mean resistivity value of the plate can be determined, thereby eliminating the need to use the uncertain resistivity value included in the thickness parameter value dependence.

With the proposed method, thickness measurements at least for thin work items are obtained with improved accuracy. Further, this allows for improved control of the thickness of rolled work items in a rolling mill, consequently allowing for higher production speed and better quality of the final processed work item.

That the thickness parameter value is dependent on the ratio between the thickness and the resistivity of the work item means that the thickness parameter value reflects that ratio. The thickness parameter value depends almost entirely on the ratio although other minor dependencies may be present. The ratio being the thickness divided by the resistivity.

Preferably, the thickness parameter value may be determined from samples in the data signal after a time delay. The time delay is sufficiently long so that any initial high signal transients caused by the pulsed magnetic field is avoided in the sampled data signal. The time delay is sufficiently long so that the time dependence of the eddy current decay in the work item depends primarily on the ratio between thickness and resistivity, but also on the distance between the measurement device detecting the magnetic field produced by the eddy currents for determining the decay, often provided as a receiver coil. Thus, the thickness parameter value may be computed based on the time dependence of the eddy current decay.

More precisely, the thickness parameter value is preferably determined from the time derivative of the magnetic flux produced by the eddy currents of the work item after a predetermined delay, and the distance between the work item and the measurement device. For example, if the distance is constant the thickness parameter value may be determined by detecting the time dependence of the eddy current decay, and then use a model that relates time dependence of eddy current decay to thickness parameter values, i.e., ratios between work item thickness and resistivity. This model may be theoretically established but may also be based on extensive prior measurements.

As mentioned above, the eddy currents may be detected by a receiver coil arranged a distance from the work item. In such case, a voltage signal is induced in the receiver coil by the time derivative of the magnetic field produced by the eddy currents in the work item. The voltage signal is preferably amplified and integrated to produce the acquired signal.

The thickness parameter value may be determined based on theoretical models.

However, in one embodiment, the thickness parameter value is determined based on an empirically determined model that relates time dependencies of eddy current decay to ratios between a thickness of the work item and a resistivity of the work item. Through multiple measurements or observations of eddy current decay time dependence versus thickness parameter value on various work items of different thickness and resistivity, it is possible to form an empirical model relating thickness parameters to eddy current decay derivatives. An empirical model is advantageously used for building an accurate model.

In embodiments, the time dependence of the eddy current decay may be measured by a magnetic field measurement device arranged a distance from the work item, the distance being determined from a sample in the data signal during an initial stage of the eddy current decay, wherein the thickness parameter value is further determined based on the determined distance. Thus, the distance between the measurement device and the work item may advantageously be determined from the data signal itself. As is known, a magnetic field strength decays with the distance to the source. This knowledge may be used for computing the distance to the work item from the measurement device, instead of measuring the distance using a separate measurement means, such as optical or capacitive measurement devices.

In embodiments, the empirically determined model may relate time dependencies of eddy current decay to ratios between a thickness of the work item and a resistivity of the work item for different distances between the work item and the magnetic field measurement device. Thus, the model may advantageously take the distance between the work item and the magnetic field measurement device into account, thereby providing a more accurate model, in particular in measurement situations where the distance between the measurement device and the work item is subjected to rapid variations.

In preferred embodiments, the mean resistivity value may be determined by filtering the instantaneous resistivity value. The filtering may be a low pass time domain filter. Thus, the instantaneous resistivity value computed from the measured thickness parameter value is passed through a low pass time domain filter, and the output of the time domain filter is the mean resistivity. The instantaneous resistivity obtained in this manner depends primarily on the thickness variations of the work item, since the resistivity of the work item may be assumed to change slowly. Thus, by filtering the instantaneous resistivity using a time domain filter the true mean resistivity of the work item may advantageously be obtained.

The length of the time domain filter, which may be a digital filter, and its properties is selected depending on the specific implementation at hand.

The inventive concept is applicable in at least three different main implementations depending on how the reference thickness value is obtained. Thus, the reference thickness value may be obtained in various conceivable ways.

Firstly, in case the reference thickness value reflects the instantaneous thickness of the work item, i.e., the instantaneous thickness is measurable as the work item is processed in the rolling mill. This is often the case for work items that are sufficiently thick for a thickness measuring device to with some acceptable accuracy measure the thickness of the work item. In this case the filter is used to reduce the measurement noise from the instantaneous thickness measurement and, then the filter should be as short as possible while providing satisfactory noise reduction.

Secondly, the reference thickness parameter value may be provided as an estimated or predetermined average thickness of the work item, i.e., a nominal thickness. For example, the predetermined average thickness value may be supplied or measured prior to processing the work item in the rolling mill.

In this case, the ratio between the reference thickness value provided as a nominal thickness value, and the thickness parameter value, the ratio forming the instantaneous resistivity value depends on the inverse of the thickness of the work item. However, passing the instantaneous resistivity value through the time domain filter, the output signal is a high-pass filtered value of the work item thickness, i.e. the signal reflects the thickness variations about the average thickness or nominal thickness. In embodiments, the high-pass filtered value of thickness variations may be used for feed-forward control, and in such case, then the length of the filter and its time domain properties must be selected in accordance with the parameters and speed of the complete control loop.

Thirdly, if the reference thickness value is provided by an inherently slow measurement, either by the measurement device itself being slow or by the measurement method being slow. Slow here means that the time constant of the reference thickness value measurement is slower than the time constant of the thickness parameter value measurement. A time constant refers to e.g., the window length of the filter in case of a running window filter. It may also refer to the complete frequency response of a measurement or filter. For example, one way to obtain the reference thickness value is to measure the thickness after the next work roll downstream in the rolling mill and use the speed of the work item, measured before and after the work roll, to estimate the thickness reduction of the work item. These devices are generally inherently slow in producing results or require long filter times. In this third case, the thickness value measured by the thickness measurement device may be filtered using a time domain filter to provide the reference thickness value. This provides for improving the accuracy of the determined thickness parameter of the work item.

Preferably, a resulting time constant of the reference thickness value filtered by the time domain filter should match a time constant of a time domain filter used for filtering the thickness parameter value. In other words, the thickness parameter value may be filtered before forming the ratio with the filtered reference thickness value. With matching time constants, the changes in the signals, i.e., the reference thickness value and the thickness parameter value, will be equal, and the ratio between them does not vary. In other words, in case the reference thickness value and the thickness parameter value are filtered with filters having equal time constants or frequency response, the instantaneous resistivity value is equal to the mean resistivity of the work item. This is particularly advantageous when the measurement device used for determining the reference thickness value is slow and further provides for speeding up the determining of the signal indicative of the present thickness of the work item. Thus, embodiments of the present invention may provide for increasing the measurement speed of such slow devices, which when applied to measurement in a rolling mill would increase the resolution of the thickness information along the work item. The methodology provided by embodiments herein provides for obtaining an updated present thickness of the work item with higher frequency, i.e., the time between updates may be improved even if using inherently slow thickness measurement devices.

In embodiments, the method may comprise providing the output signal as a feed-forward control signal to the rolling mill. In other words, the output signal may advantageously be provided for controlling the operation of a set of work rolls downstream in the rolling mill, i.e., in a feed-forward manner, before the work item reaches the work rolls. This advantageously provides for providing a higher quality, for example better thickness control, of the final product.

Thus, in embodiments, the method may comprise controlling the operation of a rolling mill stand supporting a set of work rolls of the rolling mill based on the feed-forward control signal to thereby alter the thickness of the work item.

In embodiments, the output signal may be based on the determined thickness being computed by a multiplication of the mean resistivity of the work item and the thickness parameter value.

In embodiments, the reference thickness value is a thickness value measured by a thickness measurement device of the rolling mill. For example, such a thickness measurement device may be an x-ray thickness measurement device, isotope thickness measurement device, optically based thickness measurement devices, etc.

The embodiments described herein are advantageously applied to work items being metal plates.

According to a second aspect of the invention, there is provided a control unit configured to generate an output signal indicative of a present thickness of a work item while being processed in a rolling mill, the control unit being configured to: acquire a data signal reflecting a time dependence of an eddy current decay in the work item caused by an applied pulsed magnetic field, determine a thickness parameter value based on the acquired signal, wherein the thickness parameter value is determined from samples in the data signal, the thickness parameter value being dependent on a ratio between a thickness of the work item and a resistivity of the work item, compute a ratio between a reference thickness value of the work item and the thickness parameter value to thereby provide an instantaneous resistivity value, determine a mean resistivity value based on the instantaneous resistivity value, and provide an output signal being based on the mean resistivity of the plate and the thickness parameter value, the output signal being indicative of the determined present thickness of the work item.

Further effects and features of the second aspect of the invention are largely analogous to those described above in connection with the first aspect of the invention.

According to a third aspect of the invention, there is provided a rolling mill comprising: a control unit according to embodiments of the present invention, a set of work rolls configured to process a work item between work rolls to a predetermined work item thickness, and a rolling mill stand supporting the work rolls, the rolling mill stand being controllable based on the output signal as a feed-forward signal to alter a distance between the work rolls to thereby alter the thickness of the work item being processed in the rolling mill.

Further effects and features of the third aspect of the invention are largely analogous to those described above in connection with the first aspect and the second aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION

In the present detailed description, various embodiments of the present invention are herein described with reference to specific implementations. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the scope of the invention.

Figure 1:
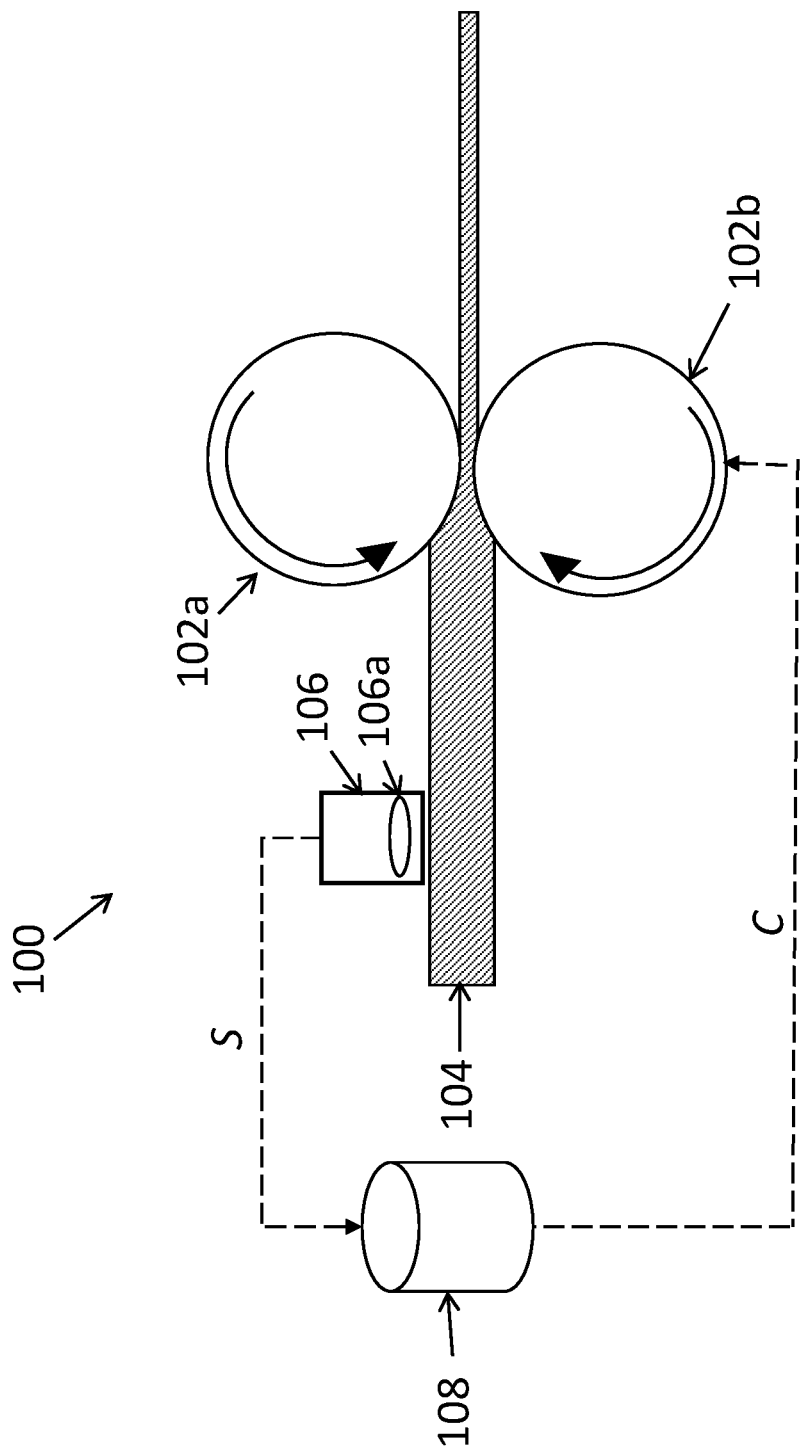
FIG. 1 conceptually illustrates a work item being processed in a rolling mill according to an embodiment of the invention.

FIG. 1 conceptually illustrates a rolling mill 100 comprising a set of work rolls 102*a* and 102*b* adapted to process a work item 104. The work rolls 102*a-b* rotates while the work item 104, e.g., metal plate, is being fed between the work rolls 102*a-b*. The work rolls 102*a-b* reduces the thickness of the work item, as is appreciated by those skilled in the art.

It is desirable to accurately control the thickness of the work item 104 being output downstream of the work rolls 102*a-b*. For this, a pulsed eddy current technology device 106 is often employed that is based on applying a pulsed magnetic field to the work item 104. The pulsed eddy current technology device 106 detects the eddy currents induced in the work item 104 for estimating a thickness of a work item portion before the work item portion reaches the work rolls 102*a-b*. The present invention concerns improving the thickness estimation. For example, for thin work items, e.g., metal plates with thickness below 1 mm, pulsed eddy current technology is noisy and is not satisfactory accurate.

A control unit 108 is here conceptually shown which is configured to generate an output signal indicative of a thickness of a work item 104 while being processed in a rolling mill.

The control unit 108 is configured to acquire a data signal S reflecting a time dependence of an eddy current decay in the work item caused by an applied pulsed magnetic field. In other words, the control unit 108 is communicatively connected, either wirelessly or hardwired, with the pulsed eddy current technology device 106 such that the control unit 108 can receive data signals from the pulsed eddy current technology device 106. The time dependence of the eddy current decay reflects the derivative of the eddy current decay in the work item 102.

The pulsed eddy current technology device 106 includes a receiver coil 106*a* in which a voltage signal is induced by the magnetic field produced by the eddy currents in the work item 104. The pulsed eddy current technology device 106 includes electronics for amplifying and integrating the voltage signal and provide the resulting signal S to the control unit 108.

Based on the acquired signal, the control unit 108 can determine a thickness parameter value (E). The thickness parameter value (E) is determined from samples in the acquired signal. Importantly, the thickness parameter value is dependent on a ratio between a thickness (t) of the work item and a resistivity (r) of the work item. In other words, E~t/r.

For thin work items, e.g., less than 1 mm thickness, the thickness parameter value may be considered the inverse of the sheet resistance, i.e., 1/sheet resistance of the work item and may be referred to as a sheet conductance.

Although the thickness parameter value reflects the ratio between the thickness and the resistivity of the work item, it is not straight-forward to extract the thickness directly from the thickness parameter value since it requires knowledge of the resistivity of the work item, and the resistivity is temperature dependent.

Instead, the control unit is configured to compute a ratio between a reference thickness value ($t_r$) of the work item and the thickness parameter value E to thereby provide an instantaneous resistivity value $r_i$. In other words, the instantaneous resistivity value is given by, $$r_i = \frac{t_r}{t/r} = \frac{t_r}{t}r.$$

Accordingly, the instantaneous resistivity value $r_i$ depends primarily on the thickness variations in the work item 104, as reflected by the ratio $$\frac{t_r}{t}$$

between the reference thickness $t_r$ and the thickness t, being part of the thickness parameter value. The resistivity r can be assumed to change very slowly and thus not affect the variations in the instantaneous resistivity value $r_i$.

Further, the control unit 108 is configured to determine a mean resistivity value $r_f$ based on the instantaneous resistivity value $r_i$. The mean resistivity value $r_f$ is advantageously determined by filtering the instantaneous resistivity value $r_i$ using a time domain filter, preferably being a low pass filter. In this way may an accurate mean resistivity of the work item be obtained. If the reference thickness value comes from a noisier thickness measurement that is computed at the same rate as the thickness parameter value, then the instantaneous resistivity value is almost constant, and depends only on the noise in the reference thickness value. In this case, the time domain filter is advantageously used for reducing the measurement noise.

The control unit 108 is configured to provide an output signal based on the mean resistivity of the work item and the thickness parameter value. The output signal being indicative of the present thickness of the work item. The present thickness (T) is preferably computed by a multiplication of the mean resistivity $r_f$ of the work item and the thickness parameter value (E), i.e., $$T = r_f E = r_f \frac{t}{r} \sim t.$$

In the case where the reference thickness value is a predetermined average thickness value, the output signal is a high-pass filtered thickness of the work item. For example, in response to a sudden thickness variation of e.g., 10%, the thickness parameter value (E) also increases by about 10%. If the time domain filter is a low-pass filter, the mean resistivity will not change immediately. Thus, the output signal being a multiplication of the mean resistivity and the thickness parameter value (E), will initially increase by about 10% since the mean resistivity has not yet changed due to the low pass filtering. After some time, the mean resistivity will decrease by about 10%, and the output signal is again equal to the reference thickness value, as before the sudden thickness variation. In other words, embodiments herein are advantageously used for monitoring thickness variations in work items.

The cut-off frequency of the high-pass filtered thickness depends on the properties of the time domain filter. For example, with a simple moving average with a 10 s window, the cut-off frequency is at about 0.024 Hz.

A time-domain filter may be a running window average, such as a running or moving average window, with a window length of about 10 s. Running window averaging is well-known in the art and may be performed in various forms, e.g., simple moving average, cumulative moving average, central moving average, weighted moving average, gaussian widows, etc. Other example filters may be first order exponential filters or binomial filters.

It should be understood the that the above process for determining the present thickness of the work item is performed while the work item 104 is being processed in the rolling mill. The accurate determination of the present thickness provides for improved control of the thickness of the work item even if the processing speed in the rolling mill, i.e., the feed speed of the work item 104 is increased. Accordingly, the control unit operates to determine the present thickness online while the work item 104 is fed through the rolling mill.

Figure 2:
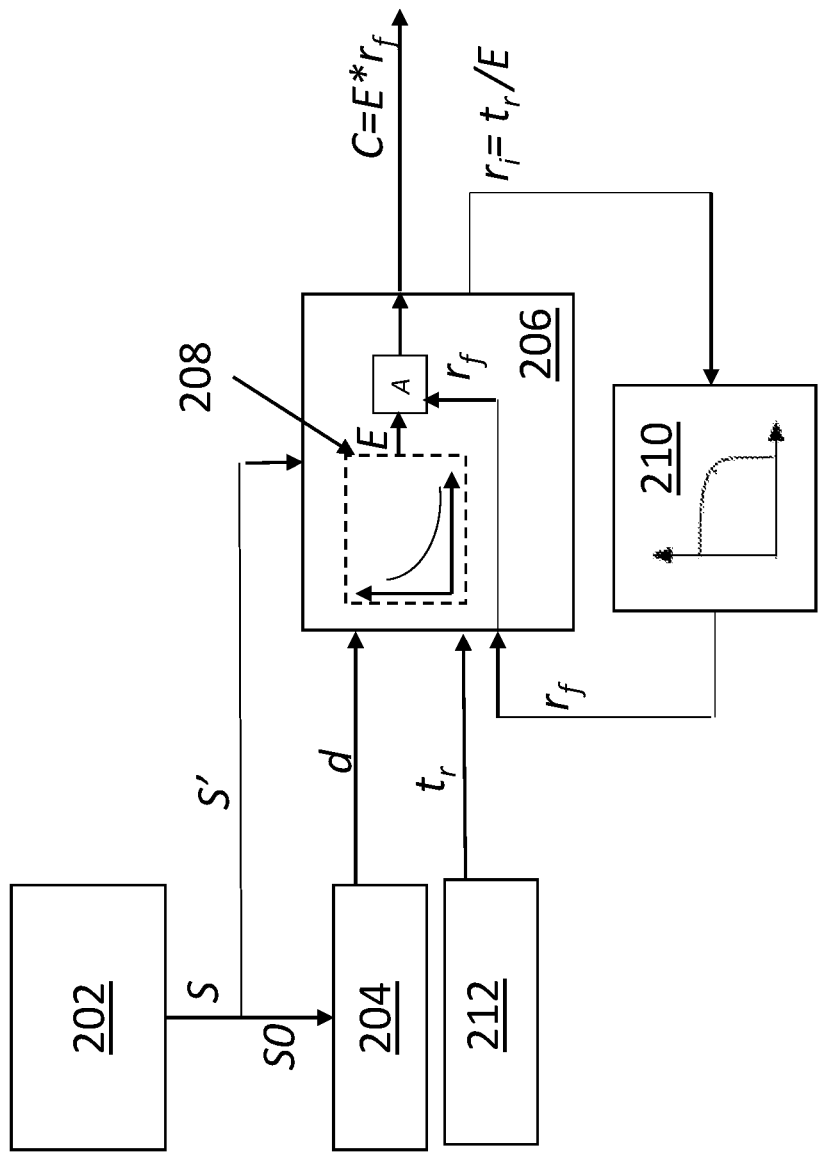
FIG. 2 is a box diagram illustrating the inventive concept according to embodiments of the invention.
Figure 3:
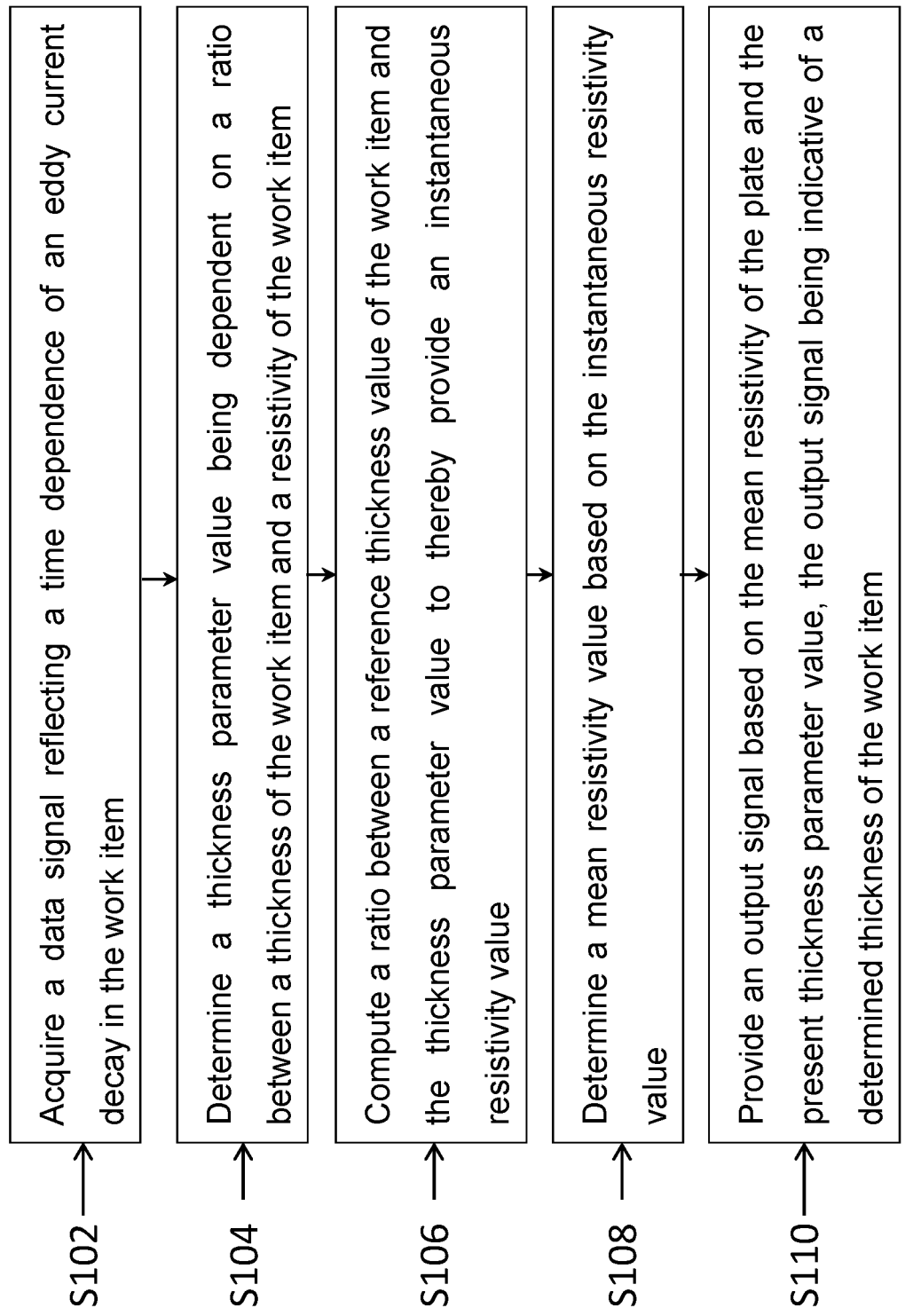
FIG. 3 is a flow-chart of method steps according to embodiments of the invention.

FIG. 2 is a box diagram illustrating the inventive concept according to embodiments of the invention. FIG. 3 is a flow chart of method steps according to embodiments of the invention and will be described in conjunction with FIG. 2.

Firstly, in step S102, acquiring a data signal reflecting a time dependence of an eddy current decay in the work item caused by an applied pulsed magnetic field. The acquired data signal S includes a set of data points, of which initial data points S0 is provided from a data sampling module 202 including suitable data acquisition electronics to a module 204 which may compute a distance, d, from a receiver coil 106a (see FIG. 1) to the work item 104. Further, at least a subset of the data points S' is provided to a thickness computation module 206. The entire acquired data signal S may be provided to a thickness computation module 206, although only selected data points are enough. The data points S' should reflect the time dependence of the eddy current decay in the work item 104.

In step S104, determining a thickness parameter value E based on the acquired signal. The thickness parameter value being determined from samples in the data signal. Further, the thickness parameter value being dependent on a ratio between a thickness of the work item and a resistivity of the work item.

The thickness parameter value may be determined from a model 208 that processes a determined eddy current time decay, such as the time derivative of the eddy current decay, and computes the thickness parameter value. The model 208 may be an empirically determined model 208 that relates time dependencies of eddy current decay to ratios between a thickness of the work item and a resistivity of the work item. In other words, the based on a presently determined eddy current time dependence, the model 208 can relate this to prior measurements and find a thickness parameter value that best matches the presently determined eddy current time dependence.

In addition, the thickness parameter value may further be determined based on the determined distance, d. Thus, the distance d, may be entered as a parameter in the model 208. The distance between the receiver coil 106a, and the work item affects the strength of the detected magnetic flux. Therefore, the distance is a parameter that may be included into the determination of the thickness parameter value E. In other words, the empirically determined model 208 may relate time dependencies of eddy current decay to ratios between a thickness of the work item and a resistivity of the work item for different distances between the work item and the magnetic field measurement device 106a.

Further, in step S106 computing a ratio between a reference thickness value $t_r$ of the work item 104 and the thickness parameter value E to thereby provide an instantaneous resistivity value $r_i$.

The reference thickness value may be obtained in various ways. For example, reference thickness value $t_r$ may be a thickness value measured by a thickness measurement device 212 of the rolling mill.

The thickness value measured by the thickness measurement device may be filtered using a time domain filter to provide the reference thickness value. Thus, the thickness measurement performed by the thickness measurement device 212 is filtered using a time domain filter, and the filtered thickness measurement is the reference thickness value $t_r$. A time constant of the time domain filter used to provide the reference thickness value is preferably identical to a time constant of a time domain filter used for filtering the thickness parameter value, E. This provides for a constant ratio between the thickness parameter value and the filtered reference thickness value which leads to that the instantaneous resistivity is equal to the mean resistivity of the work item, and to a more accurate thickness value in the output signal even if the thickness measurement device is inherently slow. However, if the reference thickness value comes from a thickness measurement that is computed at the same rate as the thickness parameter value, it is advantageous to compute the mean resistivity value directly from the quotient between the reference thickness value and the thickness parameter value, without filtering.

A time constant refers to e.g., the window length of the filter in case of a running window filter. It may also refer to the complete frequency response of a measurement or filter.

In other embodiments, the reference thickness value is a predetermined average thickness value of the work item. This predetermined average thickness value may be a manual measurement of the work item made prior to processing in the roll mill. In this case the ratio between the reference thickness value, e.g., provided as a nominal thickness value, and the thickness parameter value E, depends on the inverse of the thickness of the work item. However, passing the ratio being the instantaneous resistivity value through the time domain filter, the output signal is a high-pass filtered value of the work item thickness, i.e. the signal reflects the thickness variations about the average thickness or nominal thickness The box 212 may also represent a processing module that calculates a reference thickness value based on some algorithm.

In step S108 determining a mean resistivity value $r_f$ based on the instantaneous resistivity value. The mean resistivity value is preferably determined by filtering the instantaneous resistivity value in a time domain filter 210.

In step S110, providing an output signal C based on the mean resistivity of the work item and the thickness parameter value, the output signal being indicative of the determined present thickness of the work item. The determined thickness is calculated using an arithmetic operation A, here being a multiplication of the mean resistivity of the work item and the thickness parameter value.

As illustrated in FIG. 1, the output signal may be provided as a feed-forward control signal to the rolling mill.

Figure 4:
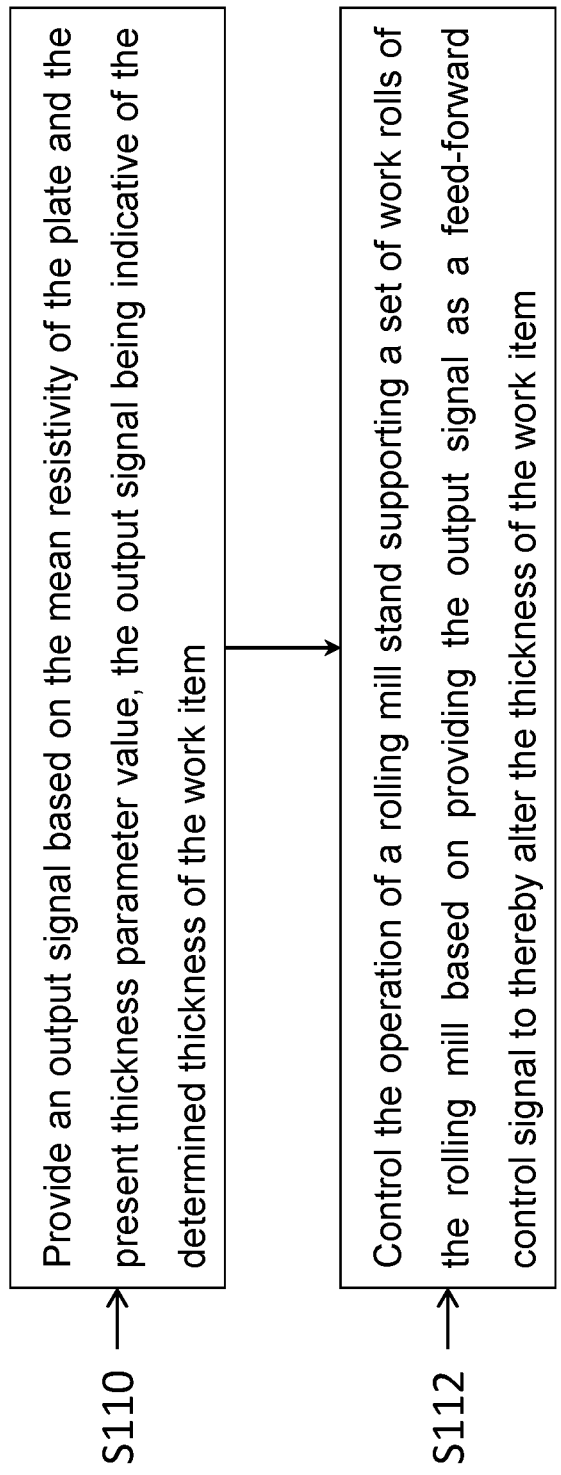
FIG. 4 is a flow-chart of method steps according to embodiments of the invention.

The method may comprise, as illustrated the flow-chart in FIG. 4 also including the step S110 from FIG. 3, controlling in the operation of a rolling mill stand supporting a set of work rolls of the rolling mill based on the feed-forward control signal C to thereby alter the thickness of the work item 104.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Communication between devices, control units or other modules described herein may be wireless or hardwired as is suitable and implement a suitable protocol for the specific case.

Even though the invention has been described with reference to specific exemplifying embodiments thereof, many different alterations, modifications and the like will become apparent for those skilled in the art.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for determining a present thickness of a work item while being processed in a rolling mill, the method comprising:
    acquiring a data signal reflecting a time dependence of an eddy current decay in the work item caused by an applied pulsed magnetic field,
    determining a thickness parameter value based on the data signal, the thickness parameter value being determined from samples in the data signal, the thickness parameter value being dependent on a ratio between a thickness of the work item and a resistivity of the work item,
    computing a ratio between a reference thickness value of the work item and the thickness parameter value to thereby provide an instantaneous resistivity value,
    determining a mean resistivity value based on the instantaneous resistivity value, and providing an output signal based on the mean resistivity of the work item and the thickness parameter value, the output signal being indicative of the present thickness of the work item.

2. The method according to claim 1, wherein the thickness parameter value is determined based on an empirically determined model that relates time dependencies of eddy current decay to ratios between a thickness of the work item and a resistivity of the work item.

3. The method according to any one of claim 1, wherein the time dependence of the eddy current decay is measured by a magnetic field measurement device arranged a distance from the work item, the distance being determined from a sample in the data signal during an initial stage of the eddy current decay, wherein the thickness parameter value is further determined based on the determined distance.

4. The method according to claim 2, wherein the empirically determined model relates the time dependencies of eddy current decay to the ratios between the thickness of the work item and the resistivity of the work item for different distances between the work item and a magnetic field measurement device for detecting eddy currents induced in the work item.

5. The method according to claim 1, wherein the mean resistivity value is determined by filtering the instantaneous resistivity value.

6. The method according to claim 1, comprising providing the output signal as a feed-forward control signal to the rolling mill.

7. The method according to claim 6, wherein the output signal is based on the present thickness being computed by a multiplication of the mean resistivity of the work item and the thickness parameter value.

8. The method according to claim 6, comprising:
controlling an operation of a rolling mill stand supporting a set of work rolls of the rolling mill based on the feed-forward control signal to thereby alter the thickness of the work item.

9. The method according to claim 1, wherein the reference thickness value is a thickness value measured by a thickness measurement device of the rolling mill.

10. The method according to claim 9, wherein the thickness value measured by the thickness measurement device is filtered using a time domain filter to provide the reference thickness value.

11. The method according to claim 10, wherein a frequency response of the time domain filter used to provide the reference thickness value is matched to a frequency response of a time domain filter used for filtering the thickness parameter value.

12. The method according to claim 1, wherein the reference thickness value is a predetermined average thickness value of the work item.

13. The method according to claim 1, wherein the work item is a metal plate.

14. A control unit configured to generate an output signal indicative of a present thickness of a work item while being processed in a rolling mill, the control unit being configured to:
acquire a data signal reflecting a time dependence of an eddy current decay in the work item caused by an applied pulsed magnetic field,
determine a thickness parameter value based on the signal, wherein the thickness parameter value is determined from samples in the data signal, the thickness parameter value being dependent on a ratio between a thickness of the work item and a resistivity of the work item,
compute a ratio between a reference thickness value of the work item and the thickness parameter value to thereby provide an instantaneous resistivity value,
determine a mean resistivity value based on the instantaneous resistivity value, and
provide the output signal being based on the mean resistivity of the work item and the thickness parameter value, the output signal being indicative of the present thickness of the work item.

15. A rolling mill comprising:
a control unit, configured to:
acquire a data signal reflecting a time dependence of an eddy current decay in a work item caused by an applied pulsed magnetic field, determine a thickness parameter value based on the signal,
wherein the thickness parameter value is determined from samples in the data signal, the thickness parameter value being dependent on a ratio between a thickness of the work item and a resistivity of the work item,
compute a ratio between a reference thickness value of the work item and the thickness parameter value to thereby provide an instantaneous resistivity value,
determine a mean resistivity value based on the instantaneous resistivity value,
provide an output signal being based on the mean resistivity of the work item and the thickness parameter value, the output signal being indicative of a present thickness of the work item, and
a set of work rolls configured to process the work item between work rolls to a predetermined work item thickness, and
a rolling mill stand supporting the work rolls, the rolling mill stand being controllable based on the output signal as a feed-forward signal to alter a distance between the work rolls to thereby alter the thickness of the work item being processed in the rolling mill.

16. The method according to any one of claim 2, wherein the time dependence of the eddy current decay is measured by a magnetic field measurement device arranged a distance from the work item,
the distance being determined from a sample in the data signal during an initial stage of the eddy current decay, wherein the thickness parameter value is further determined based on the determined distance.

17. The method according to claim 16, wherein the empirically determined model relates the time dependencies of eddy current decay to the ratios between the thickness of the work item and the resistivity of the work item for different distances between the work item and the magnetic field measurement device.

18. The method according to claim 2, wherein the mean resistivity value is determined by filtering the instantaneous resistivity value.

19. The method according to claim 2, comprising providing the output signal as a feed-forward control signal to the rolling mill.

* * * * *